United States Patent Office 3,363,082
Patented Jan. 9, 1968

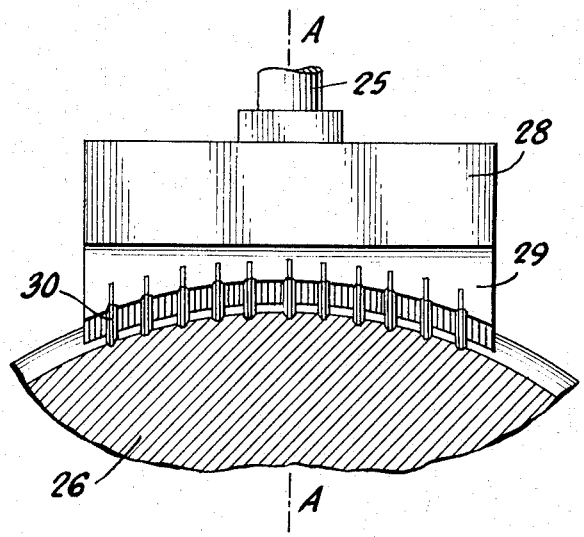
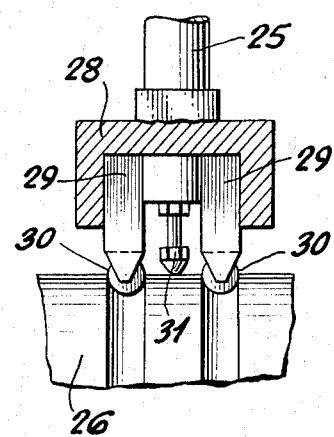
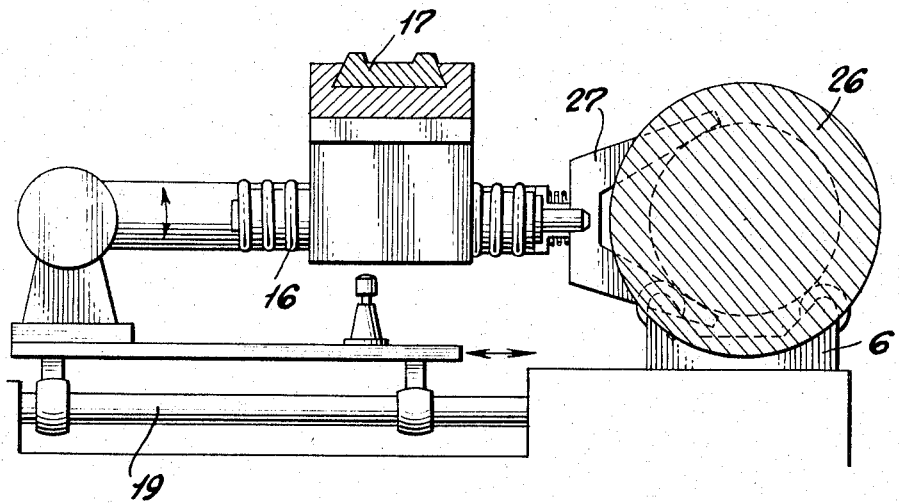

3,363,082
SEMIAUTOMATIC MULTIPLE SPINDLE ELECTRICAL DISCHARGE MACHINE TOOL FOR SINKING THE DIE IMPRESSIONS IN DIE ROLLS
Abram Lasarevich Livshits, Vadim Evgenjevich Polotsky, and Alexandr Alexandrovich, Ustjantsev, Moscow, U.S.S.R., assignors to Experimentalny nauchno-issledovatelsky institut metallorezhushchikh stankov
Filed July 22, 1963, Ser. No. 296,746
4 Claims. (Cl. 219—69)

ABSTRACT OF THE DISCLOSURE

A semiautomatic electrical discharge machine tool for the consecutive machining of die impressions in die rolls in which the spindles movable toward and away from the roll to be machined each have a holder secured thereto provided with a plurality of teeth and an electrode of erosion resistant graphite of the desired contour is mounted in each space between adjacent teeth whereby several electrodes may simultaneously machine the roll for each spindle.

---

The present invention relates to the manufacture of rolls for die rolling.

More specifically, the invention relates to machine tools for sinking die impressions in die rolls by an electrical discharge method.

Die impressions in rolls for die rolling are machined by milling cutters but this technique possesses a number of disadvantages, namely low production capacity, short tool life, high tool costs and the impossiblity of machining exceptionally hard rolls.

Attempts were made to increase the productivity and to reduce the costs in roll manufacture by the application of electrical discharge machining techniques. Electrical discharge machine tool operating on the generating principle are known, in which the tool-electrode is in the form of a rod on which is wound and soldered a specially contoured copper wire. The disadvantages of these machine tools are the comparatively low productivity due to the insufficient area of contact between the tool-electrode and the workpiece, the short life of the tool-electrode and, consequently, the large amount of copper required resulting in a high cost for the tool-electrode.

A semi-automatic machine tool is also known for machining die rolling rolling rolls which operates on the spark erosion principle (model IT-4, Czechoslovakian Socialist Republic) and in which the electrodes are of sheet iron. The disadvantages of this machine are the low productivity and high relative wear of the tool-electrodes, which may reach 100 percent of the material removed.

An object of the present invention is the provision of a high-production machine tool for sinking the die impressions in rolls for die rolling.

Another object of this invention is the provision of a machine tool to machine rolls of exceptionally hard materials.

Still another object of this invention is to provide a machine employing a comparatively inexpensive tool.

The foregoing objects of this invention are achieved in that the die impressions are sunk or formed in the rolls with an electrical discharge method employing several tool simultaneously and known hydraulically-damped solenoid-type servo control units are used as regulators and electrode holders with the electrodes being of erosion-resistant graphite. The electrodes are arranged along an equidistant line to the given contour and are supplied from independent electric circuits with self-contained regulators. The machine tool operates on a semi-automatic cycle and is equipped with an electro-mechanical stop for controlling the machining depth, adjustable roller-type supports for mounting the roll and indexing the roll after each pass, a self-adjusting crossrail for carrying the working spindles, a hydraulically-operated clamping fixture and a scale for indicating the position of the datum face on the roll in reference to the cross-rail.

Thus, a distinctive feature of the machine tool is that consecutive machining of the contour in the die impressions of the rolls is effected simultaneously with several electrode-tools of erosion-resistant graphite.

Another distinctive feature of the machine tool is the application of independent electric circuits with self-contained regulators for the current supply of the electrodes.

Still another distinctive feature of the machine tool is that the spindles carrying the electrode holders are defined by hydraulically-damped solenoid-type servo-control units arranged horizontally to exclude the influence of the weight of the electrodes connected into the supply circuits.

Yet another distinctive feature of the machine tool is that the signal indicating that the required depth of machining has been reached is given by a signal transmitter having a movable contact linked rigidly to the spindle and a fixed contact defined by the surface of the roll between the impressions with the movable contact also serving as a mechanical positive stop for limiting the spindle travel.

A further distinctive feature of the machine tool is that the cross-rail carrying the set of hydraulically-damped solenoid-type servocontrol units is provided at its ends with spring-mounted angles for ensuring accurate location of the spindles in reference to the roll being machined.

Further objects and advantages of the present invention will become more readily apparent to persons skilled in the art from the following detailed specification and annexed drawings and in which drawings:

FIGURE 3 is a fragmentary view partly in elevation and partly in cross section illustrating the holders secured to the spindles with the combs mounted in the holder, FIGURE 4 is a view taken along A—A of FIGURE 3, and FIGURE 5 is a view taken along the line B—B of FIGURE 1, the view being on an enlarged scale.

Figure 1:
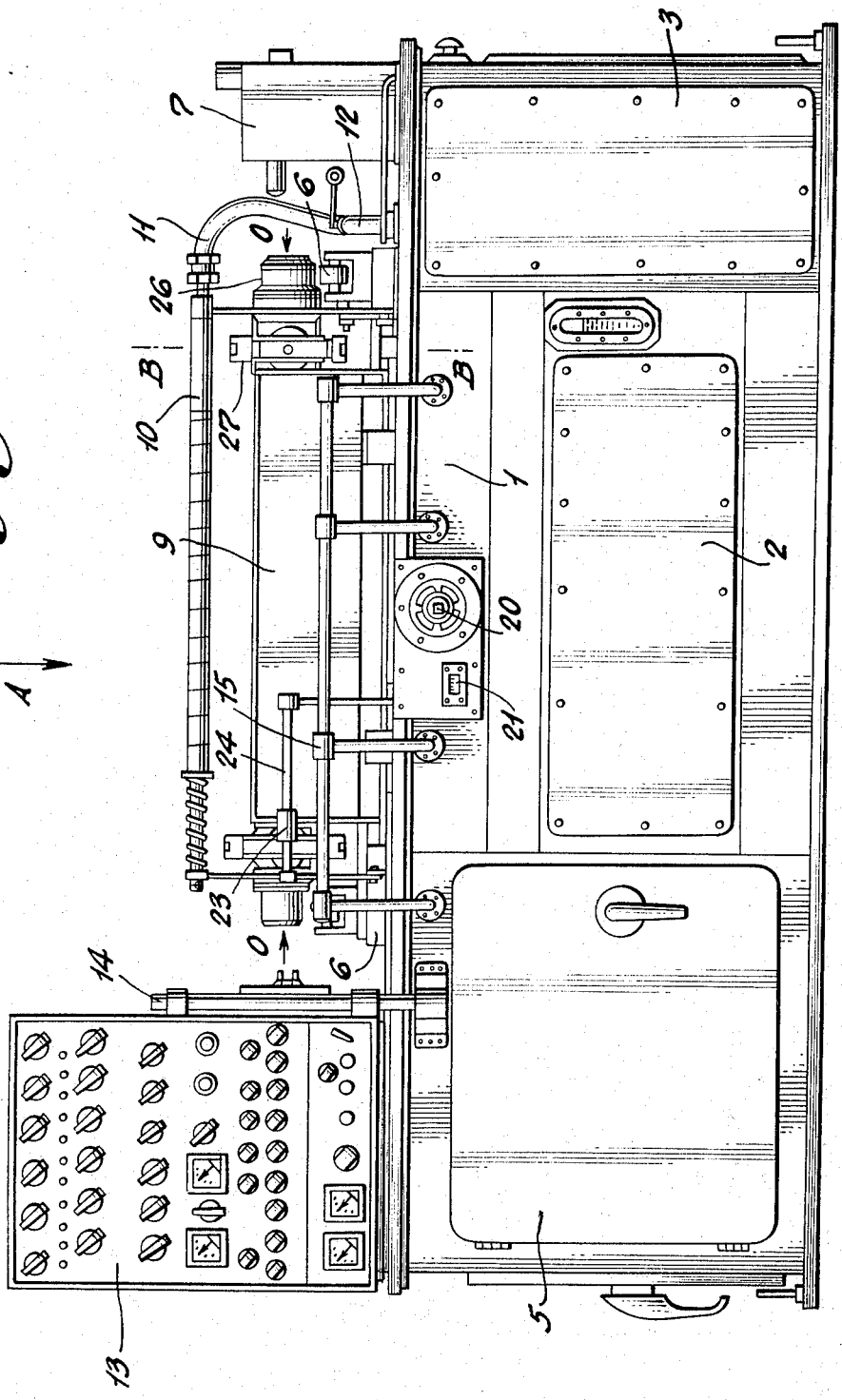
FIGURE 1 is a front elevational view of the machine tool.
Figure 2:
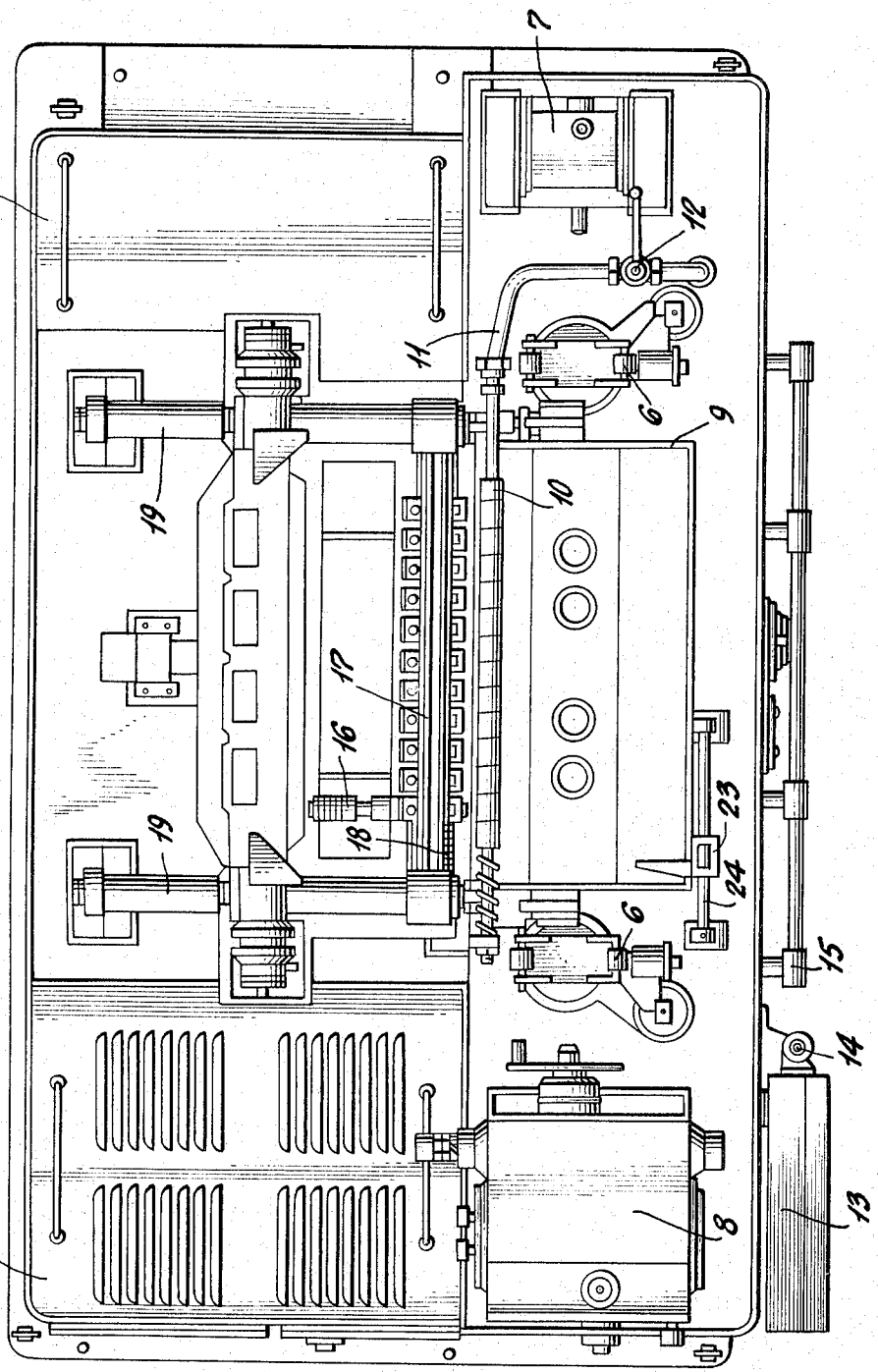
FIGURE 2 is a front plan view of the machine shown in FIGURE 1.

The machine tool as illustrated in FIGURES 1 and 2 comprises base 1 supporting an oil tank 2 for the hydraulic system, pump 3 for the dielectric fluid feed system, hydraulic control station 4 for the hydraulic system and locker 5 provided with the electric apparatus. Locating supports 6, hydraulic roll clamping mechanism 7, automatic dividing head 8, a tray 9 for collecting the dielectric oil and a dielectric fluid spraying device are mounted on the top of the base. The spraying device includes a horizontal pipe 10 provided with spray holes, hose 11 connected thereto and a valve or cock 12. The operation of the machine and the spark erosion process and all the spindles in particular is controlled from a control panel 13 pivotally mounted on a vertical post 14. A guard rail 15 is fastened on the front wall of the base and hydraulically-damped solenoid-type servocontrol units 16 (eleven are shown in the drawing) are mounted on a cross-rail 17. All of the servocontrol units have independent longitudinal and cross movements and the longitudinal movement can be ascertained on a scale 18. In addition to setting adjustments, all the servocontrol units can be advanced to and withdrawn from the roll simultaneously together with the cross-rail 17 which is traversed along circular guides 19. An adjustable stop including a screw 20 brought out on the front wall of the base, is provided to control the cross travel of the cross-rail 17. A scale 21 indicating the cross travel of the cross-rail is also located on the front wall. The ballast resistors for each independent electric circuit are located under cover 22.

The position of the end face of the roll barrel in reference to the zero graduation of the scale 18 is determined by means of an indicator 23 and a fixed scale 24 and, to accomplish the desired ends, the indicator 23 should be moved along scale 24 until it contacts the end face of the roll barrel. The zero graduations of scales 18 and 24 are located on one line that is perpendicular to the roll axis.

To ensure high-quality machining, it is necessary that the axes of all spindles 25 of the servocontrol units 16 lie in a diametral plane of a roll barrel 26. For this purpose, the cross-rail 17 is equipped at each end thereof with a spring-mounted angle 27. The bisectors of the V-slots in the angles 27 are located in one plane with the axes of the spindles 25.

Upon the advance of the cross-rail 17 to the roll 26 resting on the roller-type supports 6, both angles 27 are self-adjusted to the necks of the roll 26 and slightly lift the cross-rail 17, swinging the rail about an axis 0—0, together with servocontrol units 16 up to the required level. This arrangement enables the roll to be rapidly set up in the working position in the machine tool and overcomes the necessity for alignment of the roll position.

A holder 28 provided with combs 29 is fastened in each spindle 25. Graphite disc-electrodes 30 are inserted in the slots of the comb 29. The location of the slots in the comb depends upon the form and arrangement of the surfaces to be machined and the depth to which the roll 26 is machined is limited by an adjustable contact-stop 31 as shown in FIGURE 4.

The following must be effected to set up the machine tool before operation:

The automatic dividing head 8 is set to index to the required number of divisions in accordance with the form and size of the electrode-tool.

The spindles 25 are set to scale 18 and distances are maintained between the spindles which correspond to the distances between the die impressions in the roll 26.

The stop 20 of the cross-rail 17 is set in a position providing for the required depth in machining.

The electrode-tools 30 ase set in the combs 29 which are mounted in the holders 28 of spindles 25.

After setting up the machine tool as indicated above, the roll 26 is positioned with its necks on the supports 6, linked to the dividing head 8 with the aid of a driving dog and clamped by the roll clamping mechanism 7. The driving dog and operative units of the clamping mechansm are not shown in the drawings.

The present machine tool operates on an automatic cycle as follows:

The cross-rail 17 together with the unit 16 and spindles 25 with the electrodes 30 is advanced up to the roll 26 and the roll 26 is machined to the depth determined by the position of the stops 31. Following this operation, the cross-rail 17 is retracted or returned to its initial position.

The roll 26 is indexed through an angle of 360°/n wherein n is the number of passes.

The advance of the cross rail 17, the machining of the roll 26, etc., continues until the last indexing (or pass), after which the cross-rail 17 is returned or retracted for the last time, and then both the machine and the pulse generator are inactivated.

The present machine tool is a multiple-spindle semiautomatic machine capable of processing an extensive range of workpieces of the mill roll type and ensures an increase in productivity, since it is possible to replace from 8 to 10 milling machines and up to six spark erosion machines of the ITV-4 type. This latter type is a machine tool made in Czechoslovakia and is well known in the art. Also, a single operator can attend two or three machines and the possibility exists for machining rolls of exceptionally hard materials having a service life of 1.5 to 2 times longer than that of milled rolls and a reduction in tool costs since tool wear is within 0.1 percent of the material removed.

The principles of operation of this machine tool, the proper selection of certain of its structural components and the working capacity of its component units were checked by tests conducted on a pilot model in machining rolls No. 12 and 32, 300 and 310 mm. in diameter having hardnesses of Bhn 390, 395 and 490 for each size of roll. The tests indicated satisfactory operation of the component units and the machine as a whole. The increase in productivity, in comparison with milling, was from 1.2 to 4.5 times (for hardness—Bhn 390 and 395) and from 3.5 to 8 times, in comparison to electrical discharge techniques with an electrode of copper wire (for a hardness—Bhn 490). The wear of the electrode in machining one roll to the profile No. 32 was 0.1 mm. and in machining two rolls to the profile No. 12—0.04 mm.

The invention is not to be confined to any strict conformity to the showings in the drawings but changes or modifications may be made therein so long as such changes or modifications mark no material departure from the spirit and scope of the appended claims.

What we claim is:

1. In a semiautomatic electrical discharge machine tool for the consecutive machining of die impressions in rolls for die rolling of the type including means for accommodating the roll to be machined, and a series of spindles arranged in substantial parallelism movable toward and away from the roll, the improvement comprising a holder secured to each spindle, said holder having a plurality of teeth, and an electrode mounted in each space between adjacent teeth whereby several electrodes may simultaneously machine the roll for each spindle.

2. The semiautomatic machine tool as claimed in claim 1 in which each electrode is of erosion resistant graphite having the desired contour.

3. The semiautomatic machine tool as claimed in claim 2 in which said holder is provided with stop means for limiting the depth of the machining.

4. The semiautomatic machine tool as claimed in claim 3 including independent means for supplying current to the electrodes.

References Cited

UNITED STATES PATENTS

| 2,783,411 | 2/1957 | Matulaitis | 219—69 X |
| 2,974,215 | 3/1961 | Inoue | 219—69 X |
| 3,205,335 | 9/1965 | Johnston et al. | 219—69 |

RICHARD M. WOOD, Primary Examiner.

R. F. STAUBLY, Assistant Examiner.